US010218937B2

(12) United States Patent
Wang

(10) Patent No.: US 10,218,937 B2
(45) Date of Patent: Feb. 26, 2019

(54) VIDEO CALLING METHOD AND APPARATUS

(71) Applicant: TENCENT TECHNOLOGY (SHENZHEN) COMPANY LIMITED, Shenzhen, Guangdong (CN)

(72) Inventor: Fa Wang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 15/567,529

(22) PCT Filed: Oct. 28, 2016

(86) PCT No.: PCT/CN2016/103664
§ 371 (c)(1),
(2) Date: Oct. 18, 2017

(87) PCT Pub. No.: WO2017/084483
PCT Pub. Date: May 26, 2017

(65) Prior Publication Data
US 2018/0115746 A1 Apr. 26, 2018

(30) Foreign Application Priority Data
Nov. 17, 2015 (CN) .......................... 2015 1 0791121

(51) Int. Cl.
H04N 7/14 (2006.01)
G06F 3/0481 (2013.01)
(Continued)

(52) U.S. Cl.
CPC ........... H04N 7/147 (2013.01); G06F 3/0481 (2013.01); H04N 7/15 (2013.01); H04N 5/2222 (2013.01); H04N 21/4312 (2013.01)

(58) Field of Classification Search
CPC .. G01S 5/0072; G06F 3/0484; G06F 17/3028; H04L 12/18; H04L 43/16;
(Continued)

(56) References Cited

U.S. PATENT DOCUMENTS 9,204,098 B1 * 12/2015 Cunico .................... H04N 7/15
9,277,180 B2 * 3/2016 Cunico .................... G10L 17/06
(Continued)

FOREIGN PATENT DOCUMENTS

CN 102447873 A 5/2012
CN 103297742 A 9/2013
(Continued)

OTHER PUBLICATIONS

International Search Report for PCT/CN2016/103664 dated Feb. 6, 2017 [PCT/ISA/210].
(Continued)

Primary Examiner — Khai N. Nguyen
(74) Attorney, Agent, or Firm — Sughrue Mion, PLLC

(57) ABSTRACT

A video calling method and video calling apparatus are provided. The video calling method includes obtaining a first video image acquired by a first terminal; performing action recognition on the first video image; and sending, in response to determining an action recognition result matches a first preset action, a first preset animation corresponding to the first preset action and the first video image to a second terminal performing video calling with the first terminal for displaying by the second terminal. With the video calling apparatus, an animation related to a scenario may be generated according to the scenario, for example, a body action of a user, provided by a video, and the animation is sent to a peer device for displaying.

15 Claims, 10 Drawing Sheets

(51) Int. Cl.
*H04N 7/15* (2006.01)
*H04N 5/222* (2006.01)
*H04N 21/431* (2011.01)

(58) Field of Classification Search
CPC ... H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | | |
|---|---|---|---|---|
| 9,332,227 B2 * | 5/2016 | Cunico | .................... | G10L 17/06 |
| 9,841,879 B1 * | 12/2017 | Gray | .................... | G06F 3/0484 |
| 2008/0180306 A1 * | 7/2008 | McRae | .................... | G06F 3/01 |
| | | | | 341/176 |
| 2009/0098911 A1 * | 4/2009 | Kim | .................... | H04M 1/576 |
| | | | | 455/566 |
| 2009/0300525 A1 * | 12/2009 | Jolliff | ................ | H04M 1/72544 |
| | | | | 715/764 |
| 2014/0267543 A1 * | 9/2014 | Kerger | .................... | H04W 4/21 |
| | | | | 348/14.02 |
| 2015/0236941 A1 * | 8/2015 | Shitrit | .................... | H04L 43/16 |
| | | | | 715/736 |
| 2015/0381939 A1 * | 12/2015 | Cunico | .................... | H04N 7/157 |
| | | | | 348/14.07 |
| 2016/0127796 A1 * | 5/2016 | Wuchter | ............ | H04N 21/4882 |
| | | | | 725/34 |
| 2018/0115746 A1 * | 4/2018 | Wang | .................... | H04N 7/147 |

FOREIGN PATENT DOCUMENTS

| | | |
|---|---|---|
| CN | 103369288 A | 10/2013 |
| CN | 103916621 A | 7/2014 |
| CN | 104780339 A | 7/2015 |
| CN | 104902212 A | 9/2015 |

OTHER PUBLICATIONS

Communication dated Dec. 27, 2018 from the State Intellectual Property Office of the P.R.C. in counterpart Application No. 201510791121.7.

* cited by examiner

VIDEO CALLING METHOD AND APPARATUS

RELATED APPLICATION

This application is a National Stage of International Application No. PCT/CN2016/103664, filed on Oct. 28, 2016, which claims priority to Chinese Patent Application No. 201510791121.7, entitled "VIDEO CALLING METHOD AND APPARATUS", filed on Nov. 17, 2015 in the State Intellectual Property Office, which is incorporated herein by reference in its entirety.

FIELD

Apparatuses, methods, and devices consistent with the present disclosure relate to the field of video technologies, and in particular, to a video calling method and apparatus.

DESCRIPTION OF RELATED ART

With the development of video technologies, it is convenient for people to perform video calling and chatting with each other on a network. During a text chat, people usually send pictures in a chat window to express their emotions and actions, which greatly enriches the content of the chat and is loved by the majority of users.

SUMMARY

According to one or more exemplary embodiments, there is provided a video calling method comprising: obtaining a first video image acquired by a first terminal; performing action recognition on the first video image; and sending, in response to determining that an action recognition result matches a first preset action, a first preset animation corresponding to the first preset action and the first video image to a second terminal performing video calling with the first terminal for displaying by the second terminal.

According to one or more exemplary embodiments, there is provided a video calling apparatus comprising: an obtaining module configured to obtain a first video image acquired by a first terminal; an action recognition module configured to perform action recognition on the first video image; and a sending module configured to send, in response to determining that an action recognition result matches a first preset action, a first preset animation corresponding to the first preset action and the first video image to a second terminal performing video calling with the first terminal for displaying by the second terminal.

According to one or more exemplary embodiments, a first video image acquired by a first terminal is obtained; action recognition is performed on the first video image; in response to determining that an action recognition result matches a first preset action, a first preset animation corresponding to the first preset action and the first video image are sent to a second terminal performing video calling with the first terminal for displaying by the second terminal. When a user of the first terminal wishes to send an emotion to a user of the second terminal, the user of the first terminal only needs to make an action matching the first preset action, to automatically send the first preset animation corresponding to the first preset action to the second terminal, so that an emotion image related to a scenario can be automatically displayed according to the scenario of a video, for example, a body action of the user of the first terminal.

BRIEF DESCRIPTION OF THE DRAWINGS

The above and other aspects will become apparent from the following description of exemplary embodiments, with reference to the accompanying drawings in which.

Figure 1:
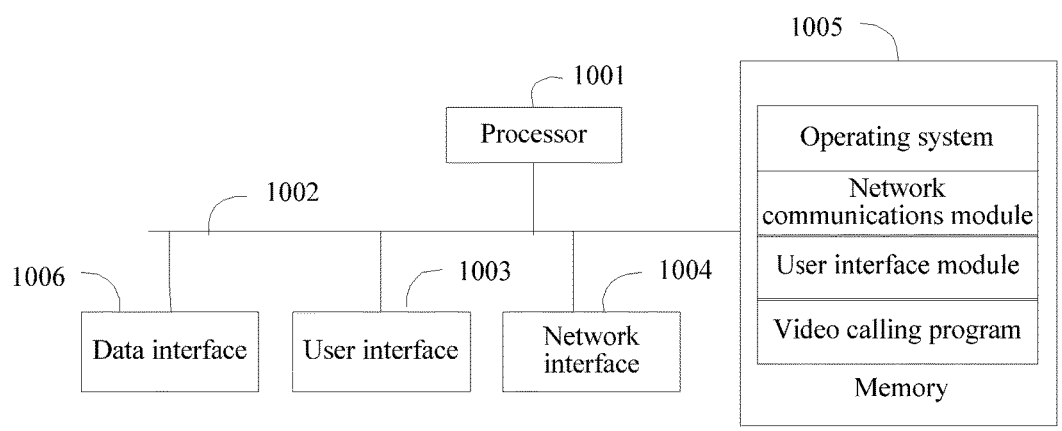
FIG. 1 is a schematic diagram of a hardware architecture of a video calling apparatus according to an exemplary embodiment.

To explicitly implement the structure of the exemplary embodiments of the present application, particular sizes, structures, and components are annotated in the figures, but this is merely exemplary and is not intended to limit this application to the particular sizes, structures, components, and environments. Based on specific requirements, a person of ordinary skill in the art may adjust or modify the components and environments, and the adjustment and modification are still included in the scope of the appended claims.

DESCRIPTION OF EXEMPLARY EMBODIMENTS

It should be understood that the specific embodiments described herein are merely intended to explain the present disclosure rather than limiting the present disclosure.

To enrich the interaction requirement of a video call, a user may further select a preset emotion image. A system overlays the emotion image selected by the user to a video picture corresponding to the user, and displays the emotion image on another user terminal performing video calling with the user. For example, when the user triggers a hat image, the system performs facial recognition on the video picture, and puts the hat above the face for displaying, so that a peer user can see a video picture that the user wears the hat. By means of the technical solution, during a video call, a particular emotion image corresponding to a trigger instruction can be displayed according to the trigger instruction of a user. However, an emotion image related to a scenario cannot be automatically displayed according to acquired video content, for example, a body action of the user in a video picture.

According to one or more exemplary embodiments, a first video image acquired by a first terminal is obtained; action recognition is performed on the first video image; in response to determining that an action recognition result matches a first preset action, a first preset animation corresponding to the first preset action and the first video image are sent to a second terminal performing video calling with the first terminal for displaying by the second terminal.

According to one or more exemplary embodiments, there is provided a video calling apparatus. The apparatus obtains, based on a first terminal, a first video image; performs action recognition on the first video image; in response to determining that an action recognition result matches a first preset action, sends a first preset animation corresponding to the first preset action and the first video image to a second terminal performing video calling with the first terminal for displaying by the second terminal, so that a corresponding preset animation emotion can be automatically displayed according to the action recognition result in a video calling process.

According to one or more exemplary embodiments, there is provided a video calling apparatus that may be implemented in a server or in a terminal. The terminal may be a computer, a mobile phone, a tablet computer, or the like. According to one or more exemplary embodiments, there are provided descriptions by using an example in which a video calling apparatus is implemented in a server. A hardware architecture related to the video calling apparatus is shown in FIG. 1.

FIG. 1 shows an example of a hardware architecture related to a video calling apparatus according to an exemplary embodiment. As shown in FIG. 1, the hardware related to the video calling apparatus includes a processor 1001, a communications bus 1002, a user interface 1003, a network interface 1004, a memory 1005, and a data interface 1006. An example of the processor 1001 may be, but not limited to, one or more central processing units (CPUs) or microprocessors. The communications bus 1002 is configured to implement connection and communication between the components in the server. The user interface 1003 may include components such as a display, a keyboard, and a mouse. The user interface 1003 is configured to receive information input by a user, and send the received information to the processor 1005 for processing. The display may be an liquid crystal display (LCD), a light emitting diode (LED) display, or may be a touch screen, etc. In some exemplary embodiments, the user interface 1003 may further include a standard wired interface or a wireless interface. The network interface 1004 may include a standard wired interface or a wireless interface (for example, a WiFi interface). The memory 1005 may be a high-speed random-access memory (RAM), or may be a stable non-volatile memory, for example, a magnetic disk storage. In some exemplary embodiments, the memory 1005 may further be a storage apparatus independent of the foregoing processor 1001. The data interface 1006 may be a USB interface or a communications interface that can receive external data. In some exemplary embodiments, the data interface 1006 further includes a device, for example, a camera configured to acquire video data. As shown in FIG. 1, the memory 1005 serving as a computer storage medium may include an operating system, a network communications module, a user interface module, and a video calling program.

According to one or more exemplary embodiments, in the server shown in FIG. 1, the network interface 1004 is configured to: connect to another application server, and perform data communication with the another application server. The user interface 1003 is configured to: connect a client, perform data communication with the client, and receive information and instructions that are input by the client. The processor 1001 may be configured to: invoke the video calling processing program of video image data that is stored in the memory 1005, and perform an operation comprising obtaining a first video image acquired by a first terminal; performing action recognition on the first video image; and sending, in response to determining that an action recognition result matches a first preset action, a first preset animation corresponding to the first preset action and the first video image to a second terminal performing video calling with the first terminal for displaying by the second terminal.

According to one or more exemplary embodiments, the processor 1001 may invoke the video calling processing program, of the video image, that is stored in the memory 1005 to perform the following operations: determining the first preset animation corresponding to the first preset action and a loading location of the first preset animation; performing composition processing on the first preset animation and the first video image according to the loading location, to generate a composite video image; and sending the composite video image to the second terminal performing video calling with the first terminal for displaying by the second terminal.

In an exemplary embodiment, the processor 1001 may invoke the video calling processing program of the video image that is stored in the memory 1005 to perform the following operations: determining the first preset animation corresponding to the first preset action and a loading location of the first preset animation; sending the first preset animation, the loading location, and the first video image to the second terminal performing video calling with the first terminal for displaying by the second terminal, where the second terminal loads the first preset animation according to the loading location, and displays the first video image that is obtained after the first preset animation is loaded.

In an exemplary embodiment, the processor 1001 may invoke the video calling processing program of the video image that is stored in the memory 1005 to perform the following operations: displaying an animation selection window in a video window of the first terminal; determining, in response to receiving a first preset animation selection instruction that is input based on the animation selection window, a first preset action prompt template corresponding to the first preset animation selection instruction; and displaying the first preset action prompt template in the video window of the first terminal, where the first preset animation selection instruction corresponds to the first preset action and the first preset animation.

In an exemplary embodiment, the processor 1001 may invoke the video calling processing program of the video image that is stored in the memory 1005 to perform the following operations: continuing performing action recognition on the first video image; obtaining a second video image acquired by the second terminal, and performing action recognition on the second video image; and sending, in response to determining that an action recognition result based on the first video image or an action recognition result based on the second video image matches a second preset action, a second preset animation associated with the first preset animation and the first video image to the second terminal for displaying by the second terminal.

In an exemplary embodiment, the processor 1001 may invoke the video calling processing program of the video image that is stored in the memory 1005 to perform the following operations: determining a second preset action prompt template associated with the first preset animation; and displaying the second preset action prompt template on the first terminal and/or the second terminal.

According to the foregoing embodiments, a first video image acquired by a first terminal is acquired; action recognition is performed on the first video image; in response to determining that an action recognition result matches a first preset action, a first preset animation corresponding to the first preset action and the first video image are sent to a second terminal performing video calling with the first terminal for displaying by the second terminal, so that a corresponding preset animation emotion can be automatically displayed according to the action recognition result in a video calling process.

Based on the foregoing hardware architecture, an exemplary embodiment of a video calling method is provided in the present disclosure.

Figure 2:
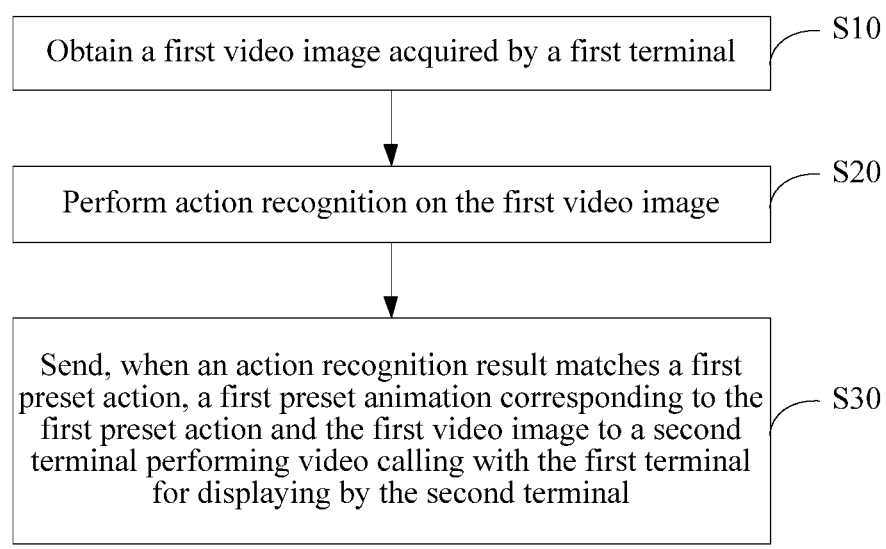
FIG. 2 is a schematic flowchart of a video calling method according to an exemplary embodiment.

FIG. 2 is a schematic flowchart of a video calling method according to an exemplary embodiment. The video calling method includes the following operations:

Operation S10: obtaining a first video image acquired by a first terminal.

In an exemplary embodiment, a chat tool such as QQ, Skype, or WeChat may be used for a video calling. The video calling method provided in an exemplary embodiment may be loaded in the foregoing chat tool software, or may be implemented in independent software.

According to one or more exemplary embodiments, there are provided descriptions by using an example in which a first terminal and a second terminal perform video calling. Each terminal may have two display windows: one display window is configured to display a video image received by the terminal, and the other display window is configured to display a video image received by the peer terminal.

According to one or more exemplary embodiments, the first terminal and the second terminal may be a mobile phone, a tablet computer, a desktop computer, or the like. The first terminal acquires the first video image by using a camera implemented in the first terminal. The second terminal acquires a second video image by using a camera implemented in the second terminal.

According to one or more exemplary embodiments, the first terminal and the second terminal may be connected in a wireless connection mode such as Bluetooth and WiFi, or may be connected by using a connection device. The connection device includes a router or the like. In an exemplary embodiment, the video calling may be performed by using a server. The server may be a server of an application program.

Operation S20: performing action recognition on the first video image.

In an exemplary embodiment, the action recognition may include human posture recognition, facial expression recognition, action behavior recognition, and/or the like. The action behavior includes a dynamic human action behavior, for example, a batting action, a hand-waving action, or the like.

In an exemplary embodiment, during the posture recognition, the following methods may be used:

(1) Sample indexing method (also referred as a template matching method): a template library may be pre-established for storing vast sample image features and corresponding posture parameters. During posture estimation, an image feature of the first video image is first extracted, then the similarity between the first video image and samples in the template library is calculated by means of measurement to find a sample most matching the first video image, and a posture corresponding to the sample is used as a current action recognition result.

(2) Function mapping method: a mapping relationship between an image feature and a posture may be directly established, and a corresponding body posture may be calculated by means of a mapping function for an image feature of the first video image. For example, a nonlinear regression function from a body silhouette feature to a three-dimensional posture parameter may be established by using a related vector machine, feature space is mapped to parameter space, and a corresponding joint angle is directly output for an input silhouette feature.

(3) Probability assembly method: some body parts (for example, a human face, a torso, or limbs) may be detected in the first video image, and then the scattered body parts may be assembled by using a probability model and by means of constraints such as the structure, dynamics, and time sequence between the body parts, to form an entire body posture.

According to one or more exemplary embodiments, during the facial expression recognition, facial detection and location may be first performed, and the facial detection may be performed in the following manner:

(1) In an exemplary embodiment, facial detection is performed based on statistics. For example, in a sample learning method, the facial detection is considered as a mode classification problem of recognizing a facial sample from a non-facial sample. A classifier is generated by learning a facial sample collection and a non-facial sample collection. Classification may be performed by using an artificial neural network. For another example, in a subspace method, the facial detection is performed by means of K-L transform, that is, the distance between an area to be detected and a feature face subspace is used as a detection statistic. The closer distance indicates the closer distance to an area in which the face is located. For another example, in a template method, a metric between a tested sample and a reference template is evaluated, and it is determined by the definition of the threshold size whether the tested sample is a face.

(2) In an exemplary embodiment, facial detection is performed based on knowledge. One type is to perform facial detection by means of a facial rule, for example, a gray-scale distribution rule, an outline rule, or a movement rule. Another type is to perform facial detection by means of color texture information. Still another type is to perform facial detection by means of facial symmetry.

After the facial detection is performed, the following several manners may be used for facial expression extraction based on a result of the facial detection:

(1) In an exemplary embodiment, recognition is performed based on a geometric feature. That is, location change of a significant feature of the facial expression is located and measured, and the expression recognition is performed by means of a feature such as the size, distance, shape, and mutual ratio.

(2) In an exemplary embodiment, recognition is performed based on statistics. That is, transform is performed on an entire emotion image, to obtain a feature for recognition. For example, the expression recognition may be performed by using a principal component analysis method, a linear discriminant analysis method, an isolated component analysis method, a neural network method, a principal component analysis method, a Fisher discriminant analysis method, or the like.

According to one or more exemplary embodiments, during the action recognition, action description is first performed, and the following methods may be used:

(1) Global feature method: in this method, the action description is performed by using a method such as a motion energy diagram, a motion history diagram, an optical flow field, a spatio-temporal volume, or a spatio-temporal shape.

(2) Local feature method: in this method, some local feature points having significant changes in a body motion image sequence (that is, a sequence of the first video image) are extracted, and statistical modeling is performed on various attributes of the feature points, to form the action description.

(3) Multi-feature convergence method: in this method, a static shape feature and a dynamic spatio-temporal interest point feature of a motion sequence are respectively extracted, to provide a hierarchical model, and the two features are tactfully combined into the same recognition frame for recognition.

According to one or more exemplary embodiments, after the action description is performed, the action recognition may be performed in the following several manners:

(1) Template matching: matching a template to be recognized with a known template set, and using, by means of similarity calculation, the type corresponding to a known template that is the most matched as a recognition result.

(2) Discriminant model: directly performing model establishment on a condition probability of an action type when a feature vector is specified. A commonest discrimination method in the action recognition field includes: a support vector machine and a conditional random field. According to one or more exemplary embodiments, the support vector machine may comprise mapping, to multidimensional space, all feature vectors to be classified; and finding, by means of maximum classification interval in the multidimensional space, a hyperplane that can classify the vectors.

(3) Generative model: the generative model is an uncertain inference model based on the probability, and the relationship between an observed feature value and action type information is established by means of a joint probability function. For different actions, parameters of models of the actions are obtained based on training data learning. During the recognition, an observed feature that is to be recognized is input into models, of types, that are obtained by means of pre-training, and the matching degree with the models are respectively calculated, to obtain a behavior type that is the most matched as a recognition result.

Operation S30: sending, in response to determining that an action recognition result matches a first preset action, a first preset animation corresponding to the first preset action and the first video image to a second terminal performing video calling with the first terminal for displaying by the second terminal.

In an exemplary embodiment, the first preset action, which may be an action with two hands hold up, a hand-waving action, or the like, may be set according to an actual requirement.

According to one or more exemplary embodiments, first preset animation may be a dynamic animation, or may be a static image.

Each first preset action may correspond to one or more first preset animations. For example, the action with two hands hold up may correspond to a cake animation, or may correspond to an image such as food or teacup at the same time. When the first preset action corresponds to multiple first preset animations, a first preset animation may be randomly selected to be sent to the second terminal with the first video image.

According to one or more exemplary embodiments, when being sent to the second terminal for displaying, the first preset animation and the first video image may further be displayed at the first terminal at the same time, so that pictures displayed on the first terminal and the second terminal are synchronized for better interaction of two users.

In an exemplary embodiment, the action with two hands hold up corresponds to the cake animation. When the first terminal and the second terminal perform video calling, if user A of the first terminal wishes to give user B of the second terminal a surprise, user A may hold two hands up. In this case, user B may see, by using the second terminal, an action of user A with two hands hold up. In this case, the first video image acquired by the first terminal includes the action of the user A with two hands up, a system recognizes the first video image, and obtains an action recognition result as the action with two hands hold up. Therefore, the system sends the cake animation corresponding to the action with two hands hold up and the first video image to the second terminal together. The first video image and the cake animation are displayed on a screen of the second terminal, so that user B may see a picture that user A holds a cake with two hands.

In the video calling method provided in an exemplary embodiment, a first video image acquired by a first terminal is obtained; action recognition is performed on the first video image; in response to determining that an action recognition result matches a first preset action, a first preset animation corresponding to the first preset action and the first video image are sent to a second terminal performing video calling with the first terminal for displaying by the second terminal. When wanting to send an emotion to a user of the second terminal, a user of the first terminal only needs to make an action matching the first preset action, to automatically send the first preset animation corresponding to the first preset action to the second terminal, so that an emotion image related to a scenario can be automatically displayed according to the scenario, for example, a body action of the user, provided by a video.

According to one or more exemplary embodiments, Operation S30 comprises the following two specific solutions.

Figure 3:
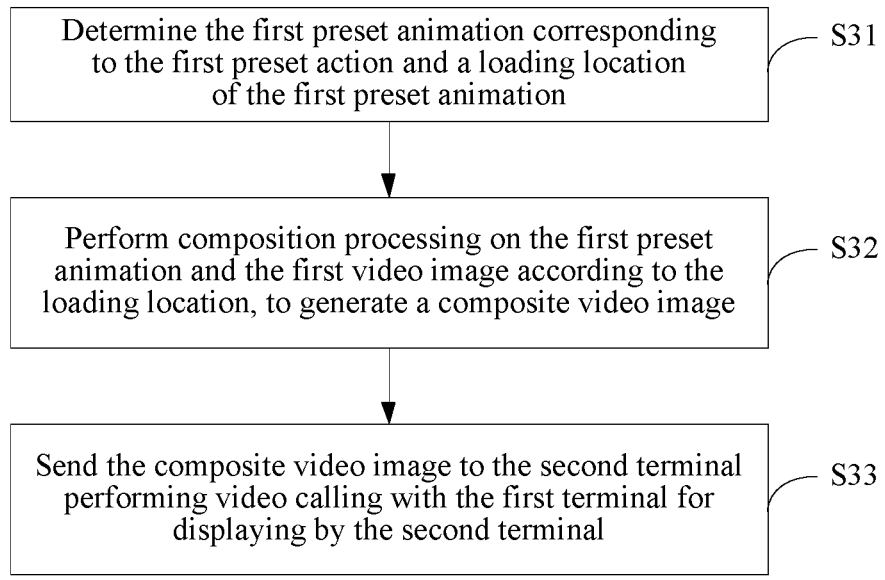
FIG. 3 is a schematic flowchart of an operation of sending a first preset animation and a first video image to a second terminal in the video calling method according to an exemplary embodiment.

(1) Solution one: in an exemplary embodiment, as shown in FIG. 3, operation S30 may include the following operations:

Operation S31: determining the first preset animation corresponding to the first preset action and a loading location of the first preset animation.

In an exemplary embodiment, a fixed loading location may be preset for the first preset animation. For example, the loading location is always on the upper side or in the middle of a screen. In an exemplary embodiment, a loading location corresponding to the action recognition result may be preset. For example, in response to the action recognition result is an action with two hands hold up, the loading location may be set above the two hands.

Operation S32: performing composition processing the first preset animation and the first video image according to the loading location to generate a composite video image.

In an exemplary embodiment, the first preset animation may be correspondingly loaded, according to the loading location, to a corresponding location of the first video image. For example, a cake is loaded to the location above the two hands of the person in the first video image. The first video image is composited frame by frame.

Operation S33: sending the composite video image to the second terminal performing video calling with the first terminal for displaying by the second terminal.

The second terminal receives the composite video image that is composited frame by frame. In an exemplary embodiment, the second terminal may only need to display the composite video image frame by frame.

In an exemplary embodiment, in Solution one, the second terminal does not need to perform any composite processing. The composite processing only needs to be performed on the first terminal. In an exemplary embodiment, the video transmission speed and the processing speed of the second terminal are not affected, so that the transmission efficiency is relatively high.

Figure 4:
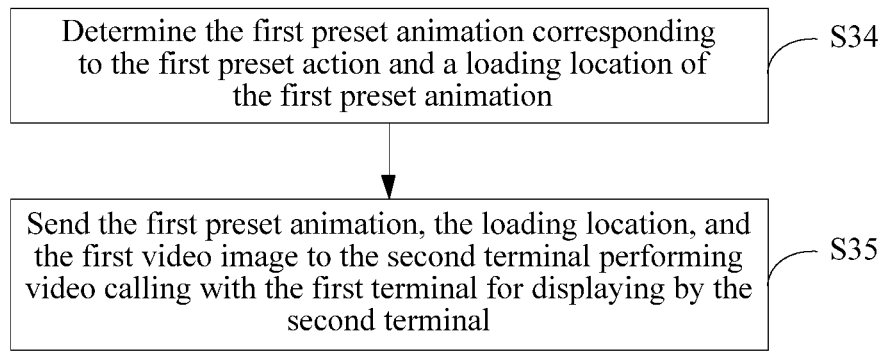
FIG. 4 is a schematic flowchart of an operation of sending a first preset animation and a first video image to a second terminal in the video calling method according to an exemplary embodiment.

(2) Solution two: in an exemplary embodiment, as shown in FIG. 4, operation S30 may include the following operations:

Operation S34: determining the first preset animation corresponding to the first preset action and a loading location of the first preset animation.

In an exemplary embodiment, a fixed loading location may be preset for the first preset animation. For example, the loading location is always on the upper or in the middle of a screen. In an exemplary embodiment, a loading location corresponding to the action recognition result may be preset. For example, when the action recognition result is an action with two hands hold up, the loading location may be set above the two hands.

Operation S35: sending the first preset animation, the loading location, and the first video image to the second terminal performing video calling with the first terminal for displaying by the second terminal.

In an exemplary embodiment, the second terminal loads the first preset animation according to the loading location, and displays the first video image that is obtained after the first preset animation is loaded.

In an exemplary embodiment, after receiving the first preset animation, the loading location, and the first video image, the second terminal may correspondingly load, according to the loading location, the first preset animation to a corresponding location of the first video image. For example, a cake is loaded to the location above the two hands of the person in the first video image. The first video image is composited frame by frame, and the composite video image only needs to be displayed frame by frame.

In an exemplary embodiment, in Solution two, the second terminal performs composition processing on the first preset animation and the first video image, so that the second terminal may flexibly determine whether to perform a composition operation. For example, when not wanting to display the first preset animation, a user of the second terminal may disable a first preset animation display function. Therefore, the solution has higher flexibility.

Figure 5:
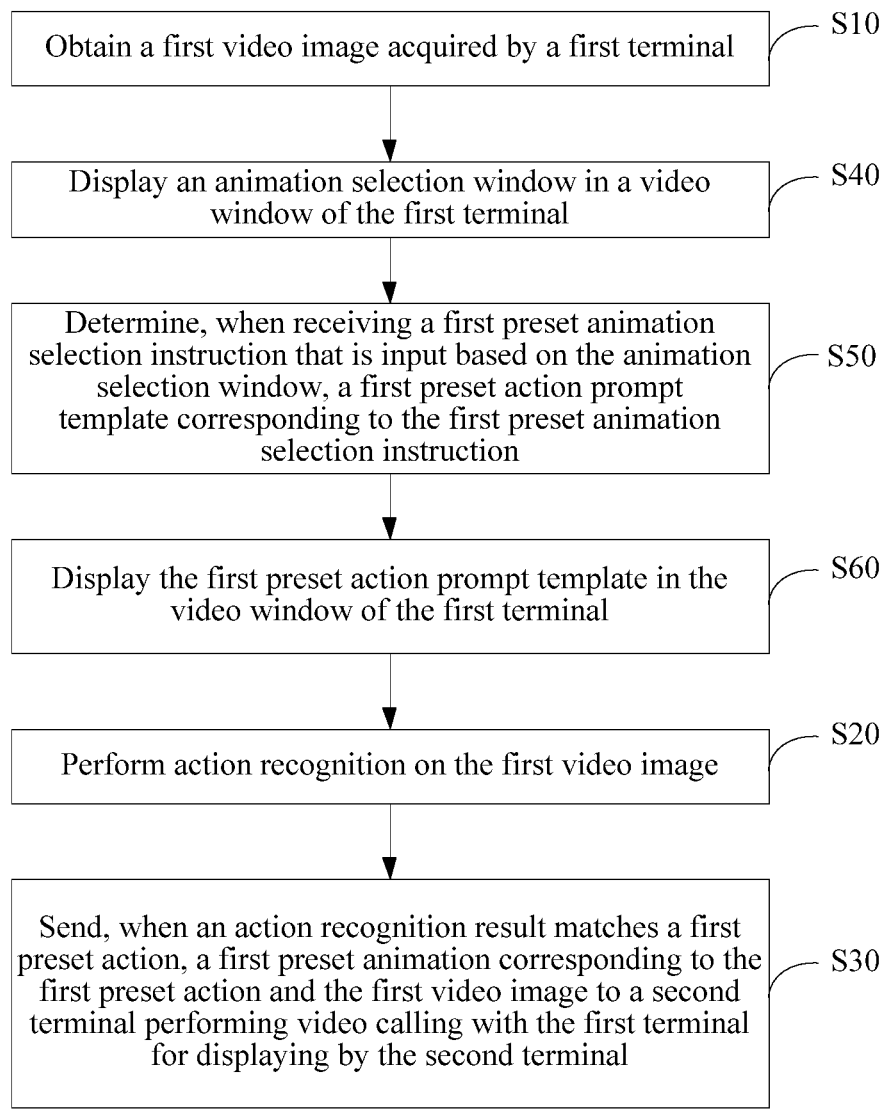
FIG. 5 is a schematic flowchart of a video calling method according to an exemplary embodiment.

In an exemplary embodiment, to further improve the flexibility of animation displaying during a video call, as shown in FIG. 5, before operation S20, the video calling method further includes the following operations:

Operation S40: displaying an animation selection window in a video window of the first terminal.

In an exemplary embodiment, the animation selection window may be automatically displayed all the time after a video call is initiated, or may be displayed according to a trigger instruction of a user. For example, a trigger control may be preset on an interface of the video call. When the trigger control is clicked by using a mouse or a shortcut key corresponding to the trigger control is pressed by using a keyboard, the animation selection window is displayed in the video call window.

In an exemplary embodiment, multiple animation identifiers may be preset in the animation selection window. For example, a cake identifier, a food identifier, or a teacup identifier may be preset. The animation identifiers may be set according to an actual requirement.

In an exemplary embodiment, an input box used for entering a word may be further preset in the animation selection window. A user may enter a word in the input box. For example, when the user enters "cake", a system automatically searches a local memory for a cake identifier, or automatically searches a network for a cake animation.

Operation S50: determining, when receiving a first preset animation selection instruction that is input based on the animation selection window, a first preset action prompt template corresponding to the first preset animation selection instruction.

In an exemplary embodiment, when a user clicks an animation identifier by using a mouse, or when the user enters, based on the foregoing input box, a corresponding word, it is considered that the first preset animation selection instruction is received.

In an exemplary embodiment, the first preset action prompt template is pre-stored in a system. For example, for a cake animation, when the user clicks a cake identifier, a first preset action prompt template corresponding to the cake identifier may be a corresponding shape outline with two hands hold up.

Operation S60: displaying the first preset action prompt template in the video window of the first terminal.

In an exemplary embodiment, the first preset animation selection instruction corresponds to the first preset action and the first preset animation.

In an exemplary embodiment, when the first preset action prompt template is displayed, an outline shape corresponding to an animation identifier may be further displayed on the upper side of the first preset action prompt template so that a user can make a corresponding action.

In an exemplary embodiment, there is provided a video calling method in which the first preset action prompt template is displayed after the user inputs the first preset animation selection instruction, and the subsequent action recognition operations are performed, thereby avoiding a misoperation of the user. For example, when user A is not intended to send a cake animation to user B, but user A mistakenly makes an action with two hands hold up during a video call, a system does not automatically send a cake animation to user B when the first preset animation selection instruction is not detected, thereby effectively avoiding the misoperation.

According to one or more exemplary embodiments, operation S40, operation S50, and operation S60 may be performed before or after operation S10, or may be performed at the same time.

Figure 6:
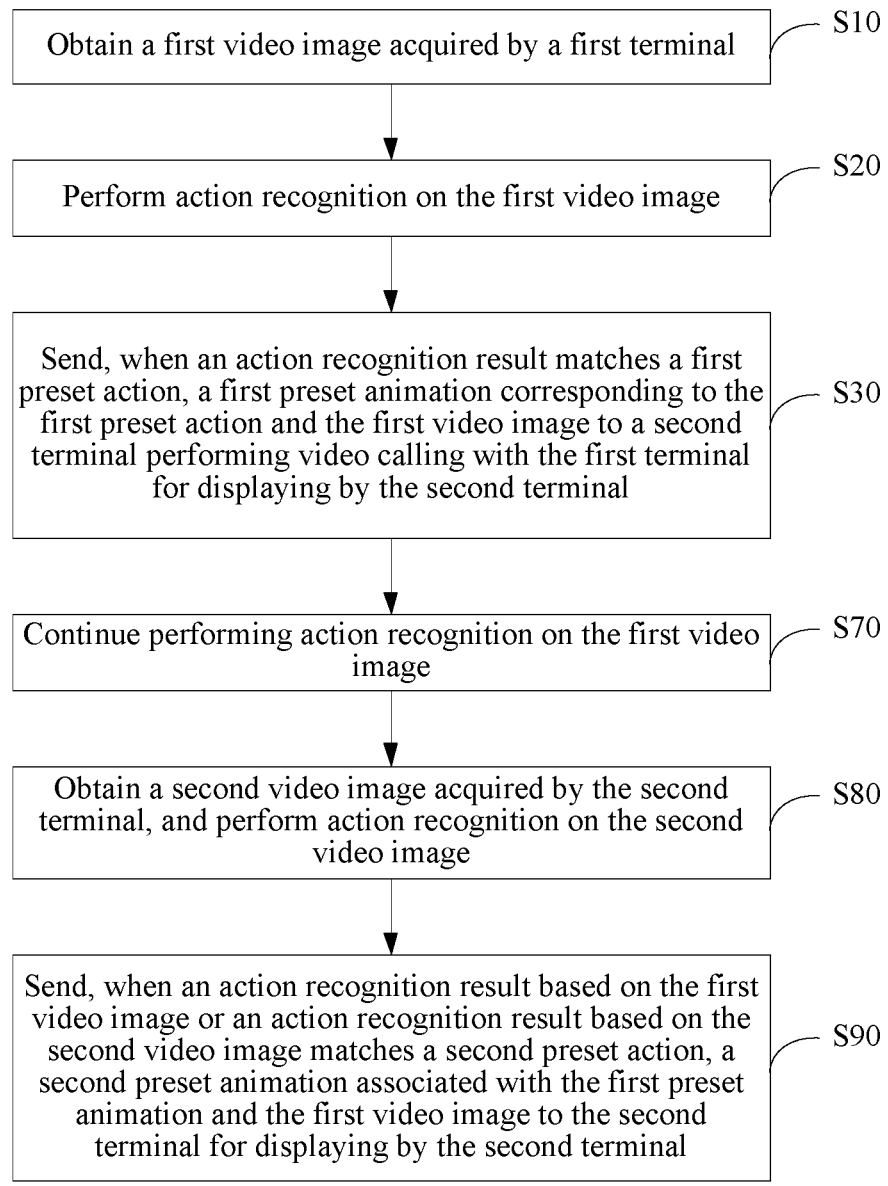
FIG. 6 is a schematic flowchart of a video calling method according to another exemplary embodiment.

According to one or more exemplary embodiments, to further improve the flexibility of animation displaying during a video call and improve the user experience, as shown in FIG. 6, after operation S30, the video calling method further includes the following operations:

Operation S70: continuing performing action recognition on the first video image.

In an exemplary embodiment, for the process of performing action recognition on the first video image, refer to the description in the foregoing embodiment, and details are not described herein again.

Operation S80: obtaining a second video image acquired by the second terminal, and perform action recognition on the second video image.

In an exemplary embodiment, in the process of performing video calling by the first terminal and the second terminal, the second terminal may send the second video image to the first terminal. After receiving the second video image, the first terminal performs the action recognition on the second video image. For the process of performing action recognition on the second video image, refer to the description of performing action recognition on the first video image in the foregoing embodiment, and details are not described herein again.

Operation S90: sending, in response to determining an action recognition result based on the first video image or an action recognition result based on the second video image matches a second preset action, a second preset animation associated with the first preset animation and the first video image to the second terminal for displaying by the second terminal.

In an exemplary embodiment, the second preset action may be set according to an actual requirement. For example, when the first preset animation is a cake, the second preset action may be an action of blowing out candles, and the second preset animation may be an animation that the candles of the cake are gradually extinguished. When either user A of the first terminal or user B of the second terminal makes the action of blowing out candles, the second terminal displays the animation that the candles of the cake are gradually extinguished.

For the sending a second preset animation and the first video image to the second terminal for displaying by the second terminal, refer to the method of displaying the video image and the preset animation in the foregoing solution one and solution two, and details are not described herein again.

According to one or more exemplary embodiments, to further improve the flexibility of animation displaying during a video call and improve the user experience, before operation S70 and after operation S30, the video calling method further includes determining a second preset action prompt template associated with the first preset animation, where for example, the first preset animation is a cake, and the second preset action prompt template may be text information, for example, words of "blowing out candles", an animation of blowing out candles, or a shape outline of blowing out candles; and displaying the second preset action prompt template on the first terminal and/or the second terminal.

In an exemplary embodiment, the second preset action prompt template may be displayed on one of the terminals. Alternatively, the second preset action prompt template may be displayed on both the first terminal and the second terminal, so that a user can accurately make a corresponding action according to the second preset action prompt template after seeing the second preset action prompt template, thereby further improving the user experience.

Figure 7:
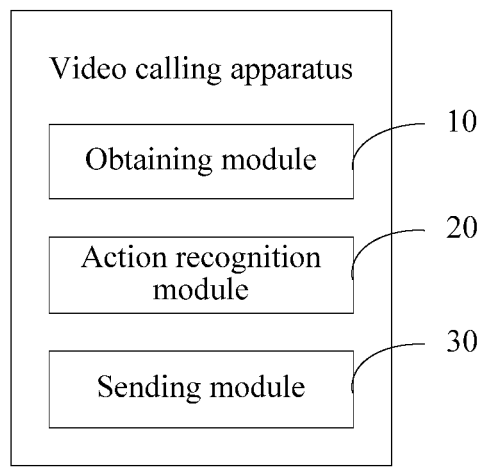
FIG. 7 is a schematic structural diagram of a video calling apparatus according to an exemplary embodiment.

According to one or more exemplary embodiments, as shown in FIG. 7, there is provided a video calling apparatus comprising an obtaining module 10, an action recognition module 20, and a sending module 30.

In an exemplary embodiment, obtaining module 10 is configured to obtain a first video image acquired by a first terminal.

In an exemplary embodiment, a chat tool such as QQ, Skype, or WeChat may be used for video calling. The video calling method may be loaded in the foregoing chat tool software, or may be implemented in independent software.

According to one or more exemplary embodiments, there are provided descriptions by using an example in which a first terminal and a second terminal perform video calling. In an exemplary embodiment, each terminal has two display windows: one display window is configured to display a video image received by the terminal, and the other display window is configured to display a video image received by the peer terminal.

In an exemplary embodiment, the first terminal and the second terminal may be a mobile phone, a tablet computer, a desktop computer, or the like. The first terminal acquires the first video image by using a camera configured in the first terminal. The second terminal acquires a second video image by using a camera configured in the second terminal.

In an exemplary embodiment, the first terminal and the second terminal may be connected in a wireless connection mode such as Bluetooth and WiFi, or may be connected by using a connection device. The connection device includes a router or the like. In an exemplary embodiment, the first terminal and the second terminal may perform the video calling by using a server. The server may be a server of an application program.

In an exemplary embodiment, the action recognition module 20 is configured to perform action recognition on the first video image.

In an exemplary embodiment, the action recognition may include human posture recognition, facial expression recognition, action behavior recognition, and/or the like. The action behavior includes a dynamic human action behavior, for example, a batting action, a hand-waving action, or the like.

According to one or more exemplary embodiments, during the posture recognition, the following methods may be used:

(1) Sample indexing method: this method also referred as a template matching method. In this method, a template library is pre-established for storing vast sample image features and corresponding posture parameters. During posture estimation, an image feature of the first video image is first extracted, then the similarity between the first video image and samples in the template library is calculated by means of measurement, to find a sample most matching the first video image, and a posture corresponding to the sample is used as a current action recognition result.

(2) Function mapping method: in this method, a mapping relationship between an image feature and a posture is directly established, and a corresponding body posture is calculated by means of a mapping function for an image feature of the first video image. For example, a nonlinear regression function from a body silhouette feature to a three-dimensional posture parameter may be established by using a related vector machine, feature space is mapped to parameter space, and a corresponding joint angle is directly output for an input silhouette feature.

(3) Probability assembly method: in this method, some body parts (for example, a human face, a torso, or limbs) are detected in the first video image, and then the scattered body parts are assembled by using a probability model and by means of constraints such as the structure, dynamics, and time sequence between the body parts, to form an entire body posture.

According to one or more exemplary embodiments, during the facial expression recognition, facial detection and location may be first performed, and the facial detection may be performed in the following manner:

(1) In an exemplary embodiment, facial detection is performed based on statistics. For example, in a sample learning method, the facial detection is considered as a mode classification problem of recognizing a facial sample from a non-facial sample. A classifier is generated by learning a facial sample collection and a non-facial sample collection. Classification may be performed by using an artificial neural network. For another example, in a subspace method, the facial detection is performed by means of K-L transform, that is, the distance between an area to be detected and a feature face subspace is used as a detection statistic. The closer distance indicates the closer distance to an area in which the face is located. For another example, in a template method, a metric between a tested sample and a reference template is evaluated, and it is determined by the definition of the threshold size whether the tested sample is a face.

(2) In an exemplary embodiment, facial detection is performed based on knowledge. One type is to perform facial detection by means of a facial rule, for example, a gray-scale distribution rule, an outline rule, or a movement rule. Another type is to perform facial detection by means of color texture information. Still another type is to perform facial detection by means of facial symmetry.

In an exemplary embodiment, after the facial detection is performed, the following several manners may be used for facial expression extraction based on a result of the facial detection:

(1) Recognition based on a geometric feature: a location change of a significant feature of the facial expression is located and measured, and the expression recognition is performed by means of a feature such as the size, distance, shape, and mutual ratio.

(2) Recognition based on statistics: transform is performed on an entire emotion image, to obtain a feature for recognition. For example, the expression recognition may be performed by using a principal component analysis method, a linear discriminant analysis method, an isolated component analysis method, a neural network method, a principal component analysis method, a Fisher discriminant analysis method, or the like.

According to one or more exemplary embodiments, during the action recognition, action description is first performed, and the following methods may be used:

(1) Global feature method: in this method, the action description is performed by using a method such as a motion energy diagram, a motion history diagram, an optical flow field, a spatio-temporal volume, or a spatio-temporal shape.

(2) Local feature method: in this method, some local feature points having significant changes in a body motion image sequence (that is, a sequence of the first video image) are extracted, and statistical modeling is performed on various attributes of the feature points, to form the action description.

(3) Multi-feature convergence method: in this method, a static shape feature and a dynamic spatio-temporal interest point feature of a motion sequence are respectively extracted, to provide a hierarchical model, and the two features are tactfully combined into the same recognition frame for recognition.

According to one or more exemplary embodiments, after the action description is performed, the action recognition may be performed in the following several manners:

(1) Template matching: matching a template to be recognized with a known template set, and using, by means of similarity calculation, the type corresponding to a known template that is the most matched as a recognition result.

(2) Discriminant model: directly performing model establishment on a condition probability of an action type when a feature vector is specified. A commonest discrimination method in the action recognition field includes: a support vector machine and a conditional random field. Usually, the support vector machine is: mapping, to multidimensional space, all feature vectors to be classified; and finding, by means of maximum classification interval in the multidimensional space, a hyperplane that can classify the vectors.

(3) Generative model: The generative model is an uncertain inference model based on the probability, and the relationship between an observed feature value and action type information is established by means of a joint probability function. For different actions, parameters of models of the actions are obtained based on training data learning. During the recognition, an observed feature that is to be recognized is input into models, of types, that are obtained by means of pre-training, and the matching degree with the models are respectively calculated, to obtain a behavior type that is the most matched as a recognition result.

In an exemplary embodiment, the sending module 30 is configured to send, in response to determining that an action recognition result matches a first preset action, a first preset animation corresponding to the first preset action and the first video image to a second terminal performing video calling with the first terminal for displaying by the second terminal.

In an exemplary embodiment, the first preset action, which may be an action with two hands hold up, a hand-waving action, or the like, may be set according to an actual requirement.

In an exemplary embodiment, the first preset animation may be a dynamic animation, or may be a static image.

In an exemplary embodiment, each first preset action may correspond to one or more first preset animations. For example, the action with two hands hold up may correspond to a cake animation, or may correspond to an image such as food or teacup at the same time. In response to determining that the first preset action corresponds to multiple first preset animations, a first preset animation may be randomly selected to be sent to the second terminal with the first video image.

In an exemplary embodiment, when being sent to the second terminal for displaying, the first preset animation and the first video image may further be displayed at the first terminal at the same time, so that pictures displayed on the first terminal and the second terminal are synchronized for better interaction of two users.

For example, the action with two hands hold up corresponds to the cake animation. When the first terminal and the second terminal perform video calling, if wanting to give a user B corresponding to the second terminal a surprise, a user A corresponding to the first terminal may hold two hands up. In this case, the user B may see, by using the second terminal, an action of the user B with two hands hold up. In this case, the first video image acquired by the first terminal includes the action of the user B with two hands up, a system recognizes the first video image, and obtains an action recognition result as the action with two hands hold up. Therefore, the system sends the cake animation corresponding to the action with two hands hold up and the first video image to the second terminal together. The first video image and the cake animation are displayed on a screen of the second terminal, so that the user B may see a picture that the user A holds a cake with two hands.

In an exemplary embodiment, a first video image acquired by a first terminal is obtained; action recognition is performed on the first video image; in response to determining an action recognition result matches a first preset action, a first preset animation corresponding to the first preset action and the first video image are sent to a second terminal performing video calling with the first terminal for displaying by the second terminal. When wanting to send an emotion to a user of the second terminal, a user of the first terminal only needs to make an action matching the first preset action, to automatically send the first preset animation corresponding to the first preset action to the second terminal, so that an emotion image related to a scenario can be automatically displayed according to the scenario, for example, a body action of the user, provided by a video.

According to one or more exemplary embodiments, the sending module 30 is described in the following two specific solutions.

Figure 8:
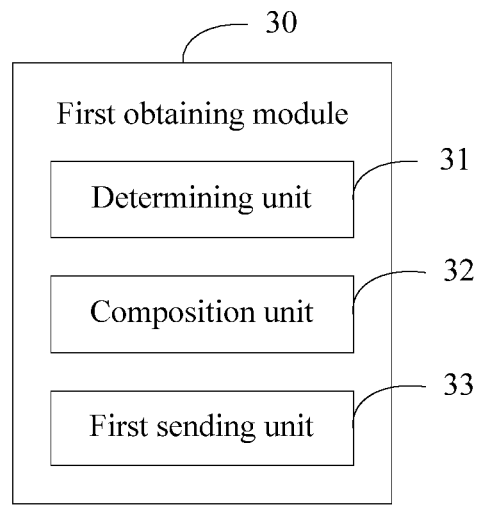
FIG. 8 is a schematic structural diagram of a sending module in a video calling apparatus according to an exemplary embodiment.

(1) Solution one: in an exemplary embodiment, as shown in FIG. 8, the sending module 30 may include a determining unit 31, a composition unit 32, and a first sending unit 33.

In an exemplary embodiment, the determining unit 31 is configured to determine the first preset animation corresponding to the first preset action and a loading location of the first preset animation.

In an exemplary embodiment, a fixed loading location may be preset for the first preset animation. For example, the loading location is always on the upper or in the middle of a screen. Further, a loading location corresponding to the action recognition result may be preset. For example, when the action recognition result is an action with two hands hold up, the loading location may be set above the two hands.

In an exemplary embodiment, the composition unit 32 is configured to perform composition processing on the first preset animation and the first video image according to the loading location, to generate a composite video image.

In an exemplary embodiment, the first preset animation may be correspondingly loaded, according to the loading location, to a corresponding location of the first video image. For example, a cake is loaded to the location above the two hands of the person in the first video image. The first video image is composited frame by frame.

In an exemplary embodiment, the first sending unit 33 is configured to send the composite video image to the second terminal performing video calling with the first terminal for displaying by the second terminal.

The second terminal receives the composite video image that is composited frame by frame. The second terminal only needs to display the composite video image frame by frame.

In an exemplary embodiment, in Solution one, the second terminal does not need to perform any composite processing. The composite processing only needs to be performed on the first terminal. In an exemplary embodiment, the video transmission speed and the processing speed of the second terminal are not affected, so that the transmission efficiency is relatively high.

Figure 9:
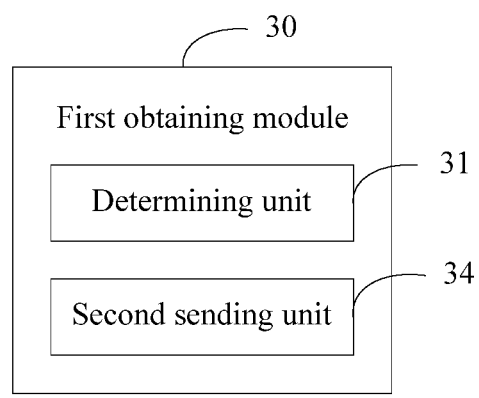
FIG. 9 is a schematic structural diagram of a sending module in a video calling apparatus according to another exemplary embodiment.

(2) Solution two: in an exemplary embodiment, as shown in FIG. 9, the sending module 30 may include a determining unit 31 and a second sending unit 34.

In an exemplary embodiment, the determining unit 31 is configured to determine the first preset animation corresponding to the first preset action and a loading location of the first preset animation.

In an exemplary embodiment, a fixed loading location may be preset for the first preset animation. For example, the loading location is always on the upper or in the middle of a screen. In an exemplary embodiment, a loading location corresponding to the action recognition result may be preset. For example, when the action recognition result is an action with two hands hold up, the loading location may be set above the two hands.

In an exemplary embodiment, the second sending unit 34 is configured to send the first preset animation, the loading location, and the first video image to the second terminal performing video calling with the first terminal for displaying by the second terminal.

The second terminal loads the first preset animation according to the loading location, and displays the first video image that is obtained after the first preset animation is loaded.

In an exemplary embodiment, after receiving the first preset animation, the loading location, and the first video image, the second terminal may correspondingly load, according to the loading location, the first preset animation to a corresponding location of the first video image. For example, a cake is loaded to the location above the two hands of the person in the first video image. The first video image is composited frame by frame, and the composite video image only needs to be displayed frame by frame.

In an exemplary embodiment, in Solution two, the second terminal performs composition processing on the first preset animation and the first video image, so that the second terminal may flexibly determine whether to perform a composition operation. For example, when not wanting to display the first preset animation, a user of the second terminal may disable a first preset animation display function. Therefore, the solution has higher flexibility.

Figure 10:
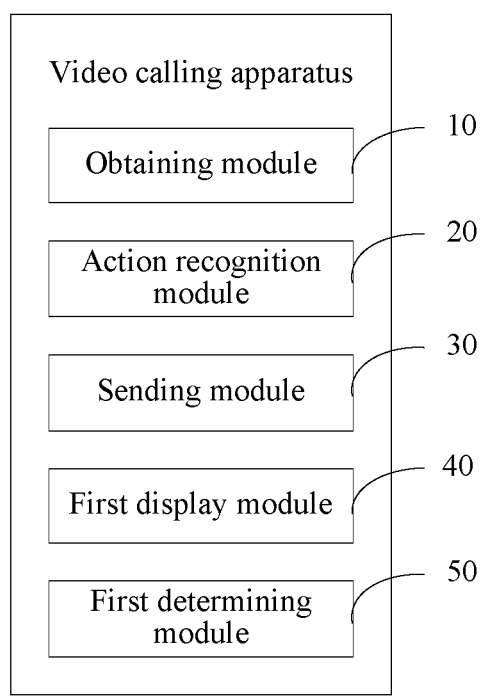
FIG. 10 is a schematic structural diagram of a video calling apparatus according to an exemplary embodiment.

In an exemplary embodiment, to further improve the flexibility of animation displaying during a video call, a second embodiment of the present invention is provided based on the foregoing first embodiment of the video calling apparatus. In an exemplary embodiment, as shown in FIG. 10, the video calling apparatus may further include a first display module 40 and a first determining module 50.

In an exemplary embodiment, the first display module 40 is configured to display an animation selection window in a video window of the first terminal.

In an exemplary embodiment, the animation selection window may be automatically displayed all the time after a video call is initiated, or may be displayed according to a trigger instruction of a user. For example, a trigger control may be preset on an interface of the video call. When the trigger control is clicked by using a mouse or a shortcut key corresponding to the trigger control is pressed by using a keyboard, the animation selection window is displayed in the video call window.

In an exemplary embodiment, multiple animation identifiers may be preset in the animation selection window. For example, a cake identifier, a food identifier, or a teacup identifier may be preset. The animation identifiers may be set according to an actual requirement.

In an exemplary embodiment, an input box used for entering a word may be further preset in the animation selection window. The user may enter a word in the input box. For example, when the user enters "cake", a system automatically searches a local memory for a cake identifier, or automatically searches the network for a cake animation.

In an exemplary embodiment, the first determining module 50 is configured to determine, in response to receiving a first preset animation selection instruction that is input based on the animation selection window, a first preset action prompt template corresponding to the first preset animation selection instruction, In an exemplary embodiment, when a user clicks an animation identifier by using a mouse, or when the user enters, based on the foregoing input box, a corresponding word, it is considered that the first preset animation selection instruction is received.

In an exemplary embodiment, the first preset action prompt template is pre-stored in a system. For example, for a cake animation, when the user clicks a cake identifier, a first preset action prompt template corresponding to the cake identifier may be a corresponding shape outline with two hands hold up.

In an exemplary embodiment, the first display module 40 is further configured to display the first preset action prompt template in the video window of the first terminal.

The first preset animation selection instruction may correspond to the first preset action and the first preset animation.

In an exemplary embodiment, in response to the first preset action prompt template is displayed, an outline shape corresponding to an animation identifier may be further displayed on the upper side of the first preset action prompt template, so that a user can make a corresponding action more veritably.

According to one or more exemplary embodiments, the first action prompt template is displayed after the user inputs the first preset animation selection instruction, and the subsequent action recognition operations are performed, thereby avoiding a misoperation of the user. For example, when user A does not want to send a cake animation to user B, but in this case, the user A makes an action with two hands hold up by mistake during a video call, a system does not automatically send a cake animation to the user B when not detecting the first preset animation selection instruction, thereby effectively avoiding the misoperation.

According to one or more exemplary embodiments, to further improve the flexibility of animation displaying during a video call and improve the user experience, there is provided a video calling apparatus in which the action recognition module 20 is further configured to continue performing action recognition on the first video image.

In an exemplary embodiment, for the process of performing action recognition on the first video image, refer to the description in the foregoing first embodiment of the video calling apparatus, and details are not described herein again.

In an exemplary embodiment, the action recognition module 20 is further configured to obtain a second video image acquired by the second terminal, and perform action recognition on the second video image.

In an exemplary embodiment, in the process of performing video calling by the first terminal and the second terminal, the second terminal may send the second video image to the first terminal. After receiving the second video image, the first terminal performs the action recognition on the second video image. For the process of performing action recognition on the second video image, refer to the description of performing action recognition on the first video image in the foregoing first embodiment of the video calling apparatus, and details are not described herein again.

In an exemplary embodiment, the sending module 30 is further configured to send, in response to determining that an action recognition result based on the first video image or an action recognition result based on the second video image matches a second preset action, a second preset animation associated with the first preset animation and the first video image to the second terminal for displaying by the second terminal.

In an exemplary embodiment, the second preset action may be set according to an actual requirement. For example, when the first preset animation is a cake, the second preset action may be an action of blowing out candles, and the second preset animation may be an animation that the candles of the cake are gradually extinguished. When either user A of the first terminal or user B of the second terminal makes the action of blowing out candles, the second terminal displays the animation that the candles of the cake are gradually extinguished.

For a specific implementation manner of sending a second preset animation and the first video image to the second terminal for displaying by the second terminal, refer to the operation of sending the first preset animation and the first video image to the second terminal, that is, refer to the foregoing solution one and solution two, and details are not described herein again.

Figure 11:
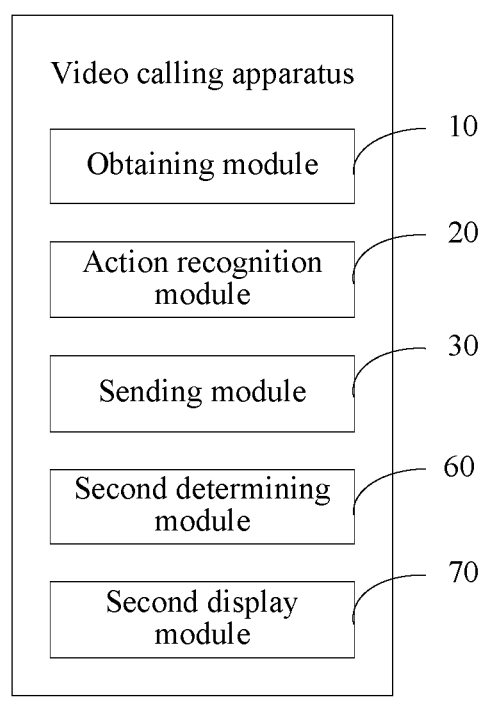
FIG. 11 is a schematic structural diagram of a video calling apparatus according to another exemplary embodiment.

In an exemplary embodiment, to further improve the flexibility of animation displaying during a video call and improve the user experience, as shown in FIG. 11, the video calling apparatus further includes a second determining module 60 and a second display module 70.

In an exemplary embodiment, the second determining module 60 is configured to determine a second preset action prompt template associated with the first preset animation.

For example, the first preset animation is a cake, and the second action prompt template may be text information, for example, words of "blowing out candles", an animation of blowing out candles, or a shape outline of blowing out candles.

In an exemplary embodiment, the second display module 70 is configured to display the second preset action prompt template on the first terminal and/or the second terminal.

In an exemplary embodiment, the second preset action prompt template may be displayed on one of the terminals. In an exemplary embodiment, the second preset action prompt template may be displayed on the first terminal and the second terminal both, so that a user can accurately make a corresponding action according to the second preset action prompt template after seeing the second preset action prompt template, thereby further improving the user experience.

Figure 12:
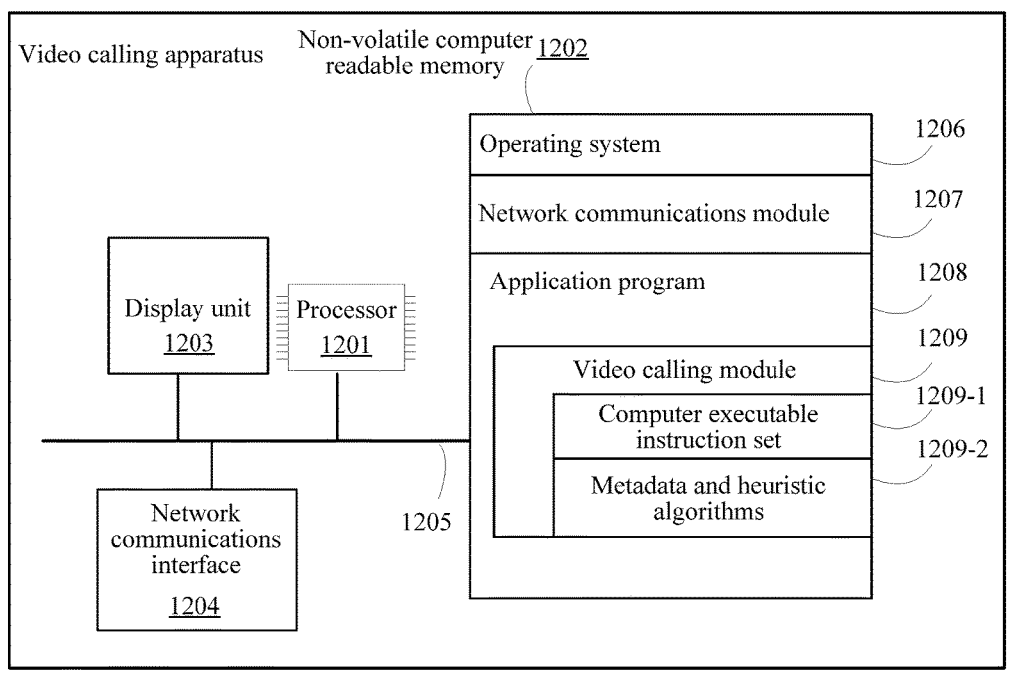
FIG. 12 is a schematic structural diagram of a video calling apparatus according to another exemplary embodiment.

FIG. 12 is a schematic structural diagram of a video calling apparatus according to an exemplary embodiment. As shown in FIG. 12, the apparatus includes: a processor 1201, a non-volatile computer readable memory 1202, a display unit 1203, and a network communications interface 1204. The components perform communication by using a bus 1205.

In an exemplary embodiment, the memory 1202 stores multiple program modules, including an operating system 1206, a network communications module 1207, and an application program 1208.

In an exemplary embodiment, the processor 1201 may read various modules (not shown in the figure) included in the application program in the memory 1202, to perform various function applications of a video call and data processing. The processor 1201 in an exemplary embodiment may be one or more, and may be a CPU, a processing unit/module, an ASIC, a logical module, a programmable gate array, or the like.

In an exemplary embodiment, the operating system 1206 may be a Windows operating system, an Android operating system, or an Apple iPhone OS operating system, or the like.

In an exemplary embodiment, the application program 1208 may include a video calling module 1209. The video calling module 1209 may include a computer executable instruction set 1209-1 including the obtaining module 10, the action recognition module 20, and the sending module 30 in the apparatus shown in FIG. 7 and corresponding metadata and heuristic algorithms 1209-2. The computer executable instruction set may be executed by the processor 1201, and the processor 1201 performs the method shown in FIG. 2 to FIG. 6 or the functions of the video calling apparatus shown in FIG. 7.

In an exemplary embodiment, the network communications interface 1204 and the network communications module 1207 cooperate to complete the receiving and sending of various network signals of the video calling apparatus.

In an exemplary embodiment, the display unit 1203 has a display panel configured to complete input and display of related information.

It needs to be noted that in this specification, the terms "include", "contain", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the object, or the device that includes the element.

The sequence numbers of the foregoing embodiments of the present invention are merely for the convenience of description, and do not imply the preference among the embodiments. A person of ordinary skill in the art may make variations, modification, replacement, or deformation to the foregoing exemplary embodiments within the scope of this disclosure, and any such variations, modifications, replacements or deformations are intended to be included in the scope of the claims.

By means of the description of the foregoing implementation manners, a person skilled in the art may clearly learn that the methods in the foregoing embodiments may be implemented by relying on software and a necessary commodity hardware platform or by using hardware, but the former one is a preferred implementation manner in many cases. Based on the understanding, the technical solutions of the present disclosure, or the part contributing to the existing technology, may essentially be presented in the form of a software product. The computer software product is stored in a storage medium including several instructions to enable a terminal device (which may be a cell phone, a computer, a server, a network device, or the like) to perform the methods described in the embodiments. The storage medium includes a computer readable medium that may be an apparatus that can include, store, communicate, propagate, or transmit programs for use by the instruction execution system, apparatus, or device or for use in combination with the instruction execution system, apparatus, or device. A more specific example (a non-exhaustive list) of the computer readable medium includes the following: an electrical connection part (electronic apparatus) having one or more wirings, a portable computer hardware box (magnetic apparatus), a random access memory, a read-only memory, an erasable programmable read-only memory (EPROM or flash memory), an optical apparatus, and a portable compact disk read-only memory (CDROM). In addition, the computer readable medium may even be paper or another appropriate medium on which the programs may be printed, as the programs may be obtained electronically through scanning optically the paper or the another appropriate medium and then compiling, interpreting, or processing in another appropriate manner, as necessary, and then the programs are stored in the computer memory.

What is claimed is:

1. A video calling method, comprising:
    obtaining a first video image acquired by a first terminal;
    performing action recognition on the first video image; and
    sending, in response to determining that an action recognition result matches a first preset action, a first preset animation corresponding to the first preset action and the first video image to a second terminal performing video calling with the first terminal for displaying by the second terminal,
    wherein the method further comprises:
        displaying an animation selection window in a video window of the first terminal;
        determining, when receiving a first preset animation selection instruction that is input based on the animation selection window, a first preset action prompt template corresponding to the first preset animation selection instruction; and
        displaying the first preset action prompt template in the video window of the first terminal, wherein
        the first preset animation selection instruction corresponds to the first preset action and the first preset animation.

2. The video calling method according to claim 1, wherein the sending a first preset animation corresponding to the first preset action and the first video image to a second terminal performing video calling with the first terminal for displaying by the second terminal comprises:
    determining the first preset animation corresponding to the first preset action and a loading location of the first preset animation;
    performing composition processing on the first preset animation and the first video image according to the loading location, to generate a composite video image; and
    sending the composite video image to the second terminal performing video calling with the first terminal for displaying by the second terminal.

3. The video calling method according to claim 1, wherein the sending a first preset animation corresponding to the first preset action and the first video image to a second terminal performing video calling with the first terminal for displaying by the second terminal comprises:
    determining the first preset animation corresponding to the first preset action and a loading location of the first preset animation; and
    sending the first preset animation, the loading location, and the first video image to the second terminal performing video calling with the first terminal for displaying by the second terminal, wherein
    the second terminal loads the first preset animation according to the loading location, and displays the first video image that is obtained after the first preset animation is loaded.

4. The video calling method according to claim 1, wherein the method further comprises:
    continuing performing action recognition on the first video image;
    obtaining a second video image acquired by the second terminal, and performing action recognition on the second video image; and
    sending, when an action recognition result based on the first video image or an action recognition result based on the second video image matches a second preset action, a second preset animation associated with the first preset animation and the first video image to the second terminal for displaying by the second terminal.

5. The video calling method according to claim 4, wherein the method further comprises:

determining a second preset action prompt template associated with the first preset animation; and displaying the second preset action prompt template on the first terminal and/or the second terminal.

6. A video calling apparatus, the video calling apparatus comprising:

at least one memory configured to store computer program code; and at least one processor configured to access the at least one memory and operate according to the computer program code, the computer program code including:

obtaining code configured to cause at least one of the at least one processor to obtain a first video image acquired by a first terminal;

action recognition code configured to cause at least one of the at least one processor to perform action recognition on the first video image; and sending code configured to cause at least one of the at least one processor to send, in response to determining an action recognition result matches a first preset action, a first preset animation corresponding to the first preset action and the first video image to a second terminal performing video calling with the first terminal for displaying by the second terminal, wherein the apparatus further comprises:

first display code configured to cause at least one of the at least one processor to: display an animation selection window in a video window of the first terminal, and display a first preset action prompt template in the video window of the first terminal; and first determining code configured to cause at least one of the at least one processor to determine, in response to receiving a first preset animation selection instruction that is input based on the animation selection window, the first preset action prompt template corresponding to the first preset animation selection instruction, wherein the first preset animation selection instruction corresponds to the first preset action and the first preset animation.

7. The video calling apparatus according to claim 6, wherein the sending code comprises:

determining code configured to cause at least one of the at least one processor to determine the first preset animation corresponding to the first preset action and a loading location of the first preset animation;

composition code configured to cause at least one of the at least one processor to perform composition processing on the first preset animation and the first video image according to the loading location, to generate a composite video image; and first sending code configured to cause at least one of the at least one processor to send the composite video image to the second terminal performing video calling with the first terminal for displaying by the second terminal.

8. The video calling apparatus according to claim 6, wherein the sending code comprises:

determining code configured to cause at least one of the at least one processor to determine the first preset animation corresponding to the first preset action and a loading location of the first preset animation; and second sending code configured to cause at least one of the at least one processor to send the first preset animation, the loading location, and the first video image to the second terminal performing video calling with the first terminal for displaying by the second terminal, wherein the second terminal loads the first preset animation according to the loading location, and displays the first video image that is obtained after the first preset animation is loaded.

9. The video calling apparatus according to claim 6, wherein the action recognition code is further configured to cause the at least one of the at least one processor to continue performing action recognition on the first video image;

the action recognition code is further configured to cause the at least one of the at least one processor to obtain a second video image acquired by the second terminal, and perform action recognition on the second video image; and the sending code is further configured to cause the at least one of the at least one processor to send, in response to determining an action recognition result based on the first video image or an action recognition result based on the second video image matches a second preset action, a second preset animation associated with the first preset animation and the first video image to the second terminal for displaying by the second terminal.

10. The video calling apparatus according to claim 9, wherein the apparatus further comprises:

second determining code configured to cause at least one of the at least one processor to determine a second preset action prompt template associated with the first preset animation; and second display module code configured to cause at least one of the at least one processor to display the second preset action prompt template on the first terminal and/or the second terminal.

11. A non-transitory computer readable medium configured to store computer program code which, when executed by at least one processor, cause the at least one processor to:

obtain a first video image acquired by a first terminal;

perform action recognition on the first video image; and send, in response to determining that an action recognition result matches a first preset action, a first preset animation corresponding to the first preset action and the first video image to a second terminal performing video calling with the first terminal for displaying by the second terminal, wherein the instructions further cause the computer to:

display an animation selection window in a video window of the first terminal;

determine, in response to receiving a first preset animation selection instruction that is input based on the animation selection window, a first preset action prompt template corresponding to the first preset animation selection instruction; and display the first preset action prompt template in the video window of the first terminal, wherein the first preset animation selection instruction corresponds to the first preset action and the first preset animation.

12. The non-transitory computer readable medium of claim 11, wherein the computer program code further causes the at least one processor to:

determine the first preset animation corresponding to the first preset action and a loading location of the first preset animation;

perform composition processing on the first preset animation and the first video image according to the loading location to generate a composite video image; and send the composite video image to the second terminal performing video calling with the first terminal for displaying by the second terminal.

13. The non-transitory computer readable medium of claim 11, wherein the computer program code further causes the at least one processor to:

determine the first preset animation corresponding to the first preset action and a loading location of the first preset animation; and send the first preset animation, the loading location, and the first video image to the second terminal performing video calling with the first terminal for displaying by the second terminal, wherein the second terminal loads the first preset animation according to the loading location, and displays the first video image that is obtained after the first preset animation is loaded.

14. The non-transitory computer readable medium of claim 11, wherein the computer program code further causes the at least one processor to:

continue performing action recognition on the first video image;

obtain a second video image acquired by the second terminal and perform action recognition on the second video image; and send, in response to determining that an action recognition result based on the first video image or an action recognition result based on the second video image matches a second preset action, a second preset animation associated with the first preset animation and the first video image to the second terminal for displaying by the second terminal.

15. The non-transitory computer readable medium of claim 14, wherein the computer program code further causes the at least one processor to:

determine a second preset action prompt template associated with the first preset animation; and display the second preset action prompt template on the first terminal and/or the second terminal.

* * * * *